(12) United States Patent
Grenga

(10) Patent No.: US 11,952,117 B1
(45) Date of Patent: Apr. 9, 2024

(54) ADJUSTABLE HELICAL CAPSTAN ROPE BRAKE

(71) Applicant: U.S. Government as Represented by the Secretary of the Army, Natick, MA (US)

(72) Inventor: Todd Grenga, Cumberland, RI (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 613 days.

(21) Appl. No.: 16/775,415

(22) Filed: Jan. 29, 2020

(51) Int. Cl.
 *B64D 1/00* (2006.01)
 *B64D 1/08* (2006.01)
 *B66D 1/74* (2006.01)

(52) U.S. Cl.
 CPC .............. *B64D 1/08* (2013.01); *B66D 1/7415* (2013.01); *B66D 1/7431* (2013.01); *B66D 1/7489* (2013.01)

(58) Field of Classification Search
 CPC .......... B64D 1/08; B64D 1/12; B66D 1/7405; B66D 1/7415; B66D 1/7431; B66D 1/7489; B66D 5/16; B66D 5/18; B66D 2700/03
 See application file for complete search history.

(56) References Cited

U.S. PATENT DOCUMENTS

| 142,017 | A | * | 8/1873 | Hart | .......................... B66D 1/26 |
| | | | | | 254/284 |
| 1,115,603 | A | | 11/1914 | Smith | |
| 3,220,511 | A | * | 11/1965 | Holkesvick | ............ B64D 17/78 |
| | | | | | 182/5 |
| 3,550,726 | A | * | 12/1970 | Bendl | ...................... A62B 1/06 |
| | | | | | 182/72 |
| 4,019,609 | A | | 4/1977 | Wagner | |
| 4,474,262 | A | * | 10/1984 | Himmelrich | ............. A62B 1/14 |
| | | | | | 182/5 |
| 4,550,801 | A | * | 11/1985 | Forrest | ..................... A62B 1/06 |
| | | | | | 182/7 |
| 4,883,146 | A | | 11/1989 | Varner et al. | |
| 6,378,650 | B2 | | 4/2002 | Mauthner | |
| 6,561,313 | B2 | | 5/2003 | Hewlett et al. | |
| 6,814,185 | B1 | * | 11/2004 | Ostrobrod | ................ A62B 1/14 |
| | | | | | 182/191 |
| 6,988,589 | B2 | | 1/2006 | R ibic | |

(Continued)

*Primary Examiner* — Emmanuel M Marcelo
(74) *Attorney, Agent, or Firm* — Timothy M. Barlow

(57) ABSTRACT

Apparatuses for controlling payload descent are described herein. For example, in one embodiment, a puck is provided that includes a top planar surface, a bottom planar surface opposite the top planar surface and an inner peripheral surface that is substantially perpendicular to the top planar surface and the bottom planar surface. The inner peripheral surface, the top planar surface and the bottom planar surface define a centrally located bore that is substantially perpendicular to the top planar surface and the bottom planar surface. Puck teeth are located on the inner peripheral surface. An outer peripheral surface bounds the top planar surface and the bottom planar surface. An exit port surface is substantially perpendicular to the top planar surface and the bottom planar surface. The exit port surface is between the inner peripheral surface and the outer peripheral surface and couples the top planar surface to the bottom planar surface.

28 Claims, 13 Drawing Sheets

(56) References Cited

U.S. PATENT DOCUMENTS

| | | | |
|---|---|---|---|
| 7,055,651 B2 * | 6/2006 | Klingler | A62B 1/14 182/5 |
| 7,510,059 B2 | 3/2009 | Reuter et al. | |
| 8,997,944 B1 | 4/2015 | Sadeck et al. | |
| 9,878,884 B1 | 1/2018 | Ellis et al. | |
| 10,035,028 B1 | 7/2018 | Siegel | |
| 10,099,071 B2 | 10/2018 | Pettey | |
| 10,112,062 B2 | 10/2018 | Colorado | |
| 10,221,918 B2 | 3/2019 | Simonson et al. | |
| 10,918,892 B2 * | 2/2021 | Dickson | A62B 1/14 |

* cited by examiner

US 11,952,117 B1

ADJUSTABLE HELICAL CAPSTAN ROPE BRAKE

STATEMENT OF GOVERNMENT INTEREST

The invention described herein may be manufactured and used by or for the U.S. Government for governmental purposes without the payment of any royalties thereon or therefor.

FIELD

Embodiments disclosed herein generally relate to controlling payloads. In particular, the material disclosed herein relates to novel apparatuses for controlling payload descent.

BACKGROUND

There are instances when items (e.g., supplies, people, etc.) need to be lowered from a first position (e.g., an aerial vehicle) to a second position that has a lower elevation than the elevation of the first position (e.g., the ground). For example, the United States military (e.g., the United States Army) often lowers supplies or personnel from an aircraft (e.g., a helicopter) to ground troops. In some instances there is a need to deliver mission essential supplies to ground troops engaged in enemy combat. Rotary wing aircraft are typically the transport platform for these supplies. Many times the aircraft cannot land and supplies are free dropped from as high as 150 feet above the ground. Losses of badly needed supplies such as medicine, ammunition, water, and food, are high, due to the free drop.

Thus, there is a need in the art for a device that helps to reduce the losses of supplies that are lowered (e.g., from an aircraft) to the ground.

SUMMARY

Embodiments herein generally relate to apparatuses for providing more control over payload descent. In particular, the present invention relates to novel apparatuses for braking systems.

For example, in one embodiment, the braking device includes a capstan. The capstan includes a proximal end, a shaft, a distal end, and a longitudinal axis. A head is on the proximal end and includes a descent line guide aligned with the longitudinal axis. A clamp assembly is on the head and is biased towards the descent line guide. A stop collar is on the shaft. Shaft threads are located on the distal end and are adapted to mate with corresponding threads on a nut. Capstan teeth are located on the shaft between the shaft threads and the stop collar. A clearance groove is located on the shaft between the stop collar and the capstan teeth. The capstan is adapted to receive a puck so that capstan teeth mate with corresponding puck teeth.

In another embodiment, the device includes a capstan and puck. The capstan includes a first end and a second end. A head is attached to the first end and a clamp assembly is attached to the head. Machined threads are located on the second end. A stop collar is located between the head and the machined threads. Capstan teeth are located between the stop collar and the machined threads. A clearance groove is located between the stop collar and the capstan teeth. A puck is present that has a top surface, a bottom surface, an outer peripheral surface, and an inner peripheral surface. The top surface of the puck and the bottom surface of the puck include an aligned bore therethrough. The top surface of the puck and the bottom surface of the puck are bounded by the outer peripheral surface and the inner peripheral surface. The inner peripheral surface of the puck includes puck teeth that are adapted to mate with the capstan teeth. The puck teeth have a height that is less than a height of the clearance groove.

In yet another embodiment, a puck is provided that includes a top planar surface and a bottom planar surface opposite the top planar surface. There is an inner peripheral surface that is substantially perpendicular to the top planar surface and the bottom planar surface. The inner peripheral surface couples the top planar surface to the bottom planar surface. The inner peripheral surface, the top planar surface and the bottom planar surface define a centrally located bore that is substantially perpendicular to the top planar surface and the bottom planar surface. The inner peripheral surface is adapted to receive a capstan shaft. Puck teeth are located on the inner peripheral surface. The puck teeth are adapted to mate with capstan teeth on the capstan shaft. An outer peripheral surface also bounds the top planar surface and the bottom planar surface. A substantially planar exit port surface is substantially perpendicular to the top planar surface and the bottom planar surface. The substantially planar exit port surface couples the top planar surface to the bottom planar surface. The substantially planar exit port surface is between the inner peripheral surface and the outer peripheral surface.

BRIEF DESCRIPTION OF THE DRAWINGS

So that the manner in which the above recited features of the present material can be understood in detail, a more particular description that is briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Embodiments presented herein are illustrated by way of example, and are not limited by the accompanying figures, in which like references indicate similar elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

In the following description, numerous specific details are set forth to provide a more thorough understanding. As will be apparent to those skilled in the art, however, various changes using different configurations may be made without departing from the scope of the disclosed material. In other instances, well-known features have not been described in order to avoid obscuration. Thus, the invention is not considered limited to the particular illustrative embodiments shown in the specification and all such alternate embodiments are intended to be included in the scope of the appended claims.

"Symmetrical" means having similar shaped and arranged parts corresponding to one another about or across an axis or plane, respectively. "Asymmetrical" means having parts that fail to correspond to one another in shape, size, or arrangement about or across an axis or plane, respectively. In some embodiments, a puck is shaped as a closed plane curve, meaning a surface profile of the puck, bends around smoothly and continuously until its joins on itself. Examples of closed plane curves include, but are not limited to, circles; ellipses; and ovals.

In various embodiments, a puck is adapted to receive a capstan. The puck is also adapted to receive a rope. The capstan includes some type of mechanism that secures the rope to the mechanism. The puck may be rotated about the capstan so that the rope is also wrapped around the capstan. Teeth provided on the puck are adapted to mate with teeth on the capstan.

After the puck is rotated to provide the desired number of wraps of rope around the capstan, the puck is moved so that the puck teeth are engaged with the teeth on the capstan. Engagement of the puck teeth with the capstan teeth locks number of wraps in place on the capstan. The number of wraps of the rope around the capstan determines the clamping force (i.e., braking force) provided by the rope to the capstan.

One of the benefits of the pucks described herein is an ability to rout the rope through the securing mechanism and the hole in the puck, a user may set the amount of braking force for a desired load before the load is secured to the rope or after the load is secured to the rope. By knowing the payload weight, a user may have the puck rotated so that the rope has the appropriate braking force without actually seeing the payload.

Figure 1A:
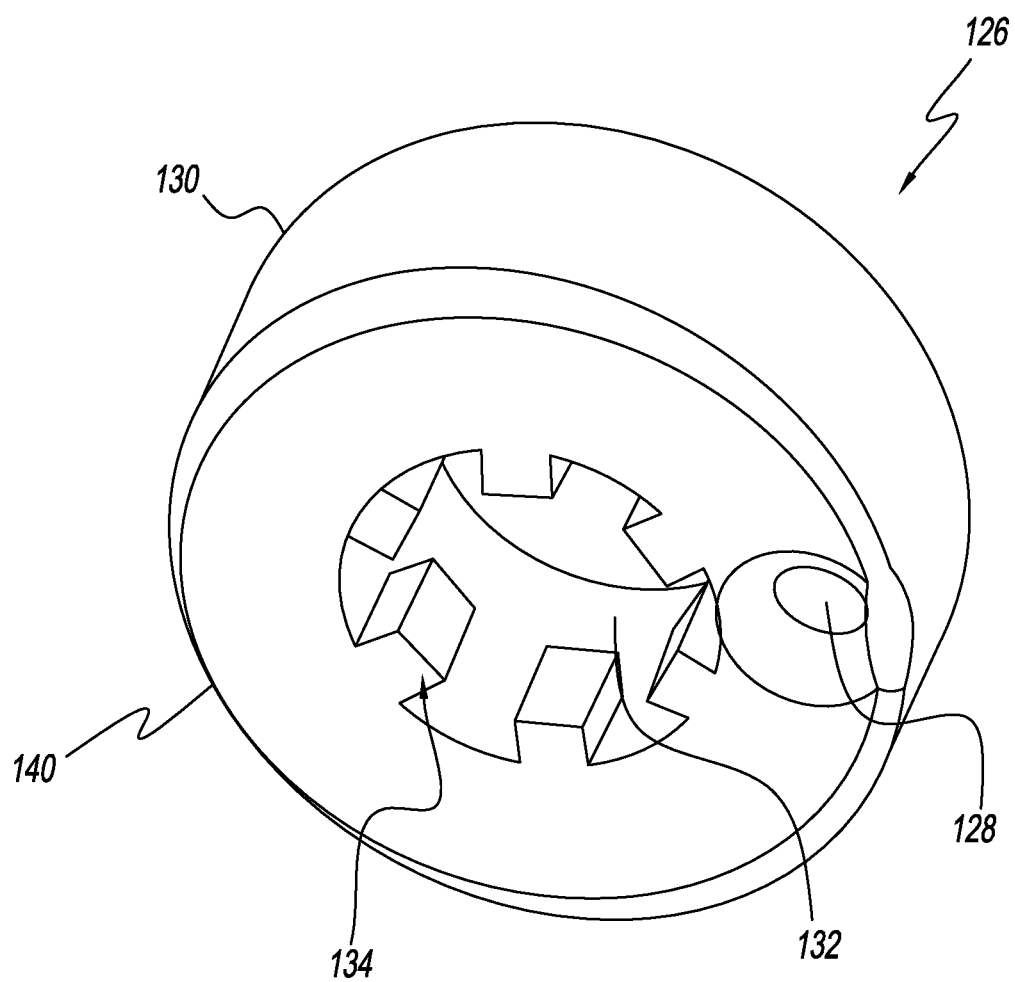
FIG. 1A depicts a perspective view of an embodiment of a device in accordance with aspects disclosed herein.

FIG. 1A depicts a perspective view of an embodiment of a puck (also referred to herein as "puck 126") in accordance with aspects disclosed herein. The puck 126 includes an outer periphery 130, in inner periphery 132, a bottom planar surface 140 (also referred to herein as a "bottom surface 140"), and a top planar surface 139 (also referred to herein as a "top surface 139") (not shown in FIG. 1A). The puck 126 also includes an exit port 128 that is adapted to receive a rope (not shown in FIG. 1A). The inner periphery 132 also includes puck teeth 134 that are adapted to engage/mate with teeth on a capstan (not shown in FIG. 1A). For illustrative purposes only, the outer periphery 130 is depicted as having a closed-plane-curve that is a circle.

Figure 1B:
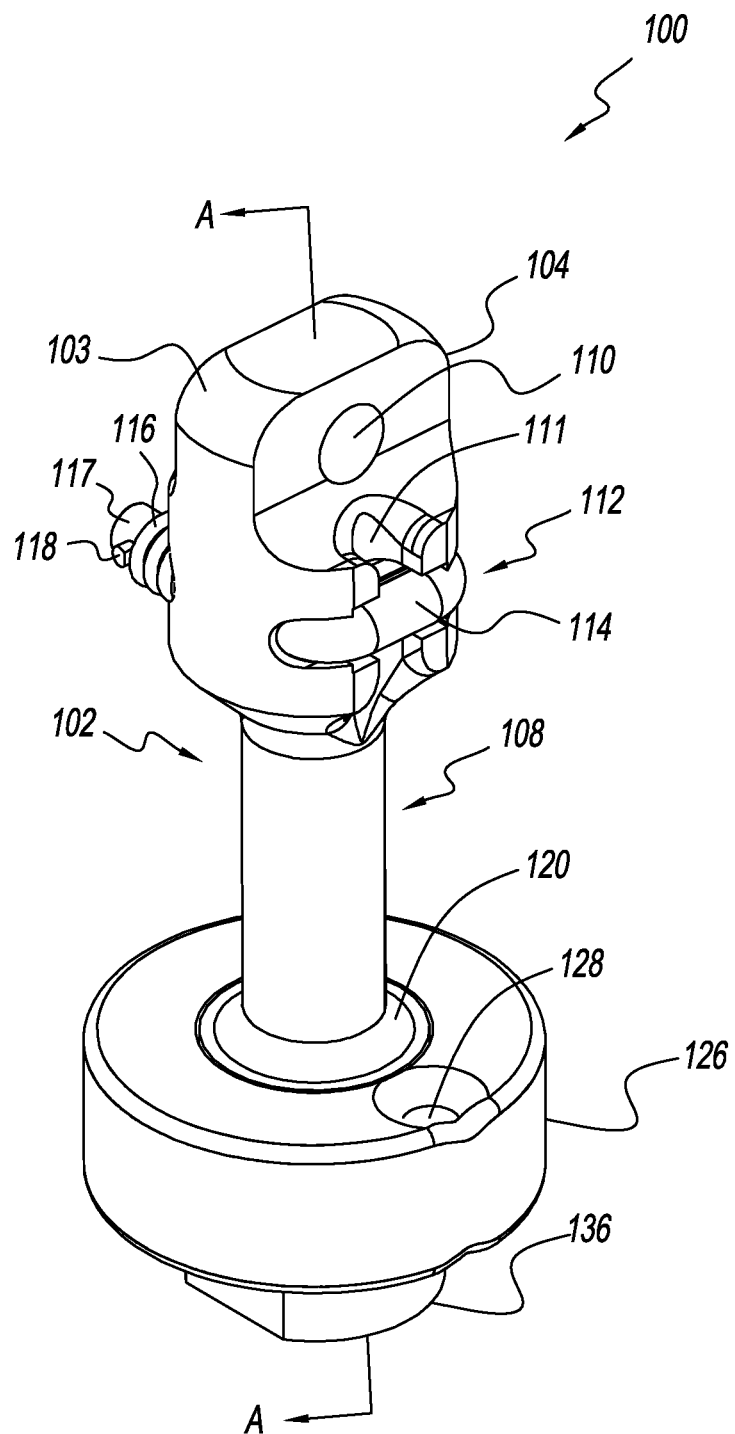
FIG. 1B depicts a perspective view of an embodiment of a device in accordance with aspects disclosed herein.

FIG. 1B depicts a perspective view of an embodiment of braking device 100 in accordance with aspects disclosed herein. For example, the braking device 100 may include a main body 102, a clamp assembly 112, the puck 126, and a nut 136. In some embodiments, the anchor-point 110, the head 103, the capstan shaft 108, the stop collar 120, and capstan teeth 122 are one unitary piece. However, in other embodiments, the anchor-point 110, the head 103, the capstan shaft 108, the stop collar 120, and/or capstan teeth 122 are made and then subsequently secured to the remaining components. For example, in one embodiment the head 103, the capstan shaft 108, the stop collar 120, and capstan teeth 122 are one unitary piece and the anchor point 110 is subsequently secured to the unitary piece (for example, see element 504).

The main body 102 has a longitudinal axis, a proximal end 104 and a distal end 106 (not shown in FIG. 1). Near the proximal end 104 is the head 103, the anchor-point 110, the clamp subassembly 112, a descent line guide 111, and a clamp bar recess 113 (not shown in FIG. 1) for receiving a U-shaped clamp bar 114. For illustrative purposes only, the anchor-point 110 is depicted as a bore through the head 103 that is adapted to receive coupling devices to secure the device 100 to a structure (e.g., a helicopter). The descent line guide 111 is substantially parallel to the longitudinal axis and is sufficient in size to allow a rope to pass therein.

The clamp subassembly 112 includes the U-shaped clamp bar 114, compression springs 116 and a stop pin 118. The U-shaped clamp bar 114 includes two tines 117 (only one tine 117 is visible in FIG. 1). Two bores (not visible in FIG. 1) in the clamp bar recess 113 (not shown in FIG. 1) are adapted to receive the tines 117. A compression spring 116 is placed on each of the tines 117 after the tines 117 pass through the bores. The stop pin 118 is inserted through aligned bores 119 on the tines 117 to secure the compression springs onto the tines 117 and the clamp subassembly 112 to the main body 102. A rope (not shown in FIG. 1) is passed down through the descent line guide 111 between the main body 102 and U-shaped clamp bar 114. The descent line guide 111 keeps the rope aligned to pass through the clamp bar 114. For illustrative purposes only a rope is defined herein as any type of line, strand, cord, cable, or string that is capable of being tethered to an object.

Extending away from the proximal end 104 and towards the distal end 106 is the capstan shaft 108. In some embodiments, the capstan shaft 108 is depicted as being cylindrical. However, in other embodiments, the capstan shaft 108 is non-cylindrical (i.e., the diameter of the capstan shaft 108 is non-uniform).

As the capstan shaft 108 extends along the longitudinal axis away from the proximal end 104 towards the distal end 106 is a stop collar 120. Further away from the proximal end 104, of the main body 102, than the stop collar 120 are capstan teeth 122. On the main body 102, between the stop collar 120 and the capstan teeth 122 is a clearance groove 138. Neither the clearance groove 138 nor the capstan teeth 122 are shown in FIG. 1.

At the distal end 106 are capstan threads 124. The capstan threads 124 are adapted to receive the nut 136. When the puck 126 is inserted onto the capstan shaft 108 through the distal end 106, the nut 136 is screwed onto the distal end 106 via the capstan threads 124. The stop collar 120 and nut 136 keep the puck 126 in communication with the main body 102.

Figure 1C:
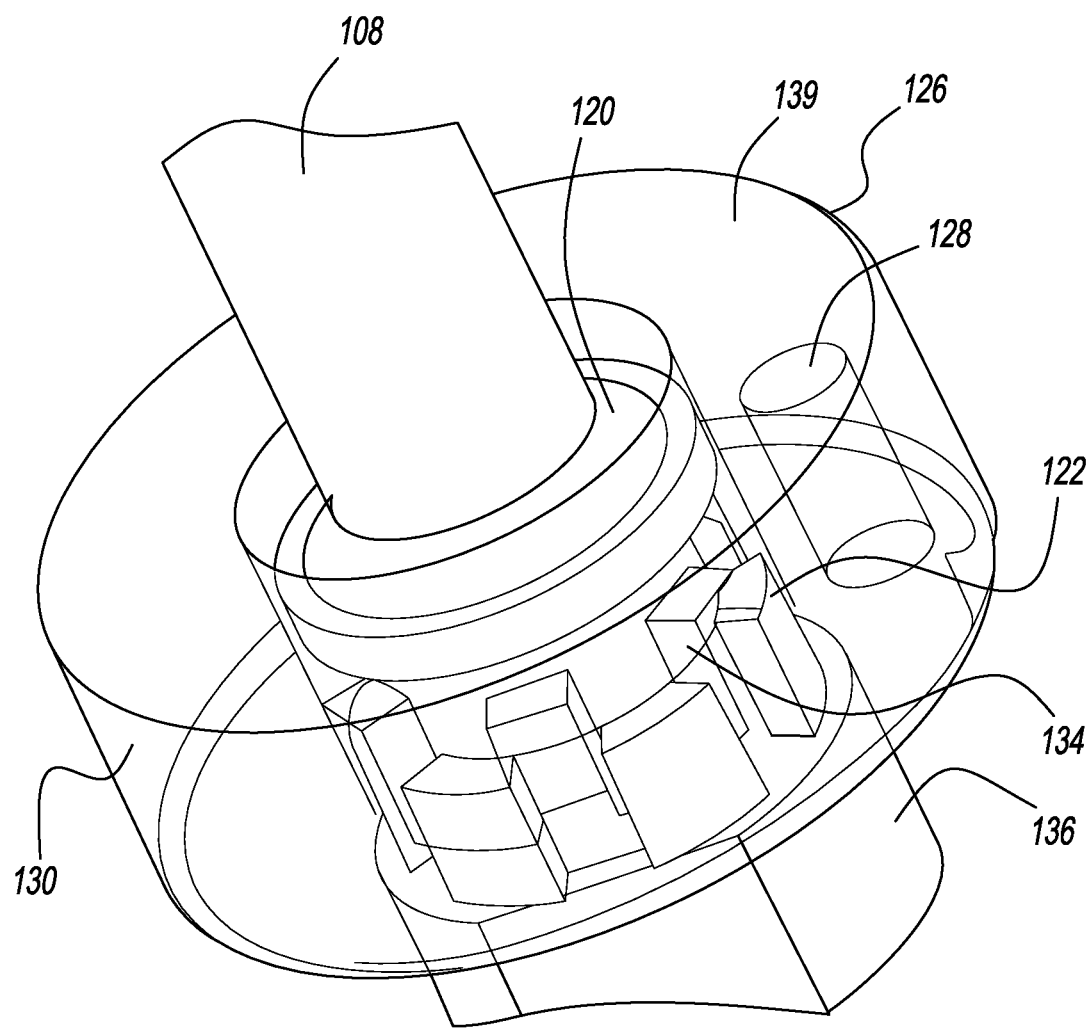
FIG. 1C depicts a close-up perspective view of the embodiment depicted in FIG. 1B.

FIG. 1C depicts a close-up perspective view of the embodiment depicted in FIG. 1B. In FIG. 1C, the puck 126 is shown in phantom with the puck teeth 134 in "partial communication" with the capstan teeth 122. The puck teeth 134 are referred to as being in partial communication because a portion of the puck teeth 134 are in the clearance groove 138. When the puck teeth 134 are fully within the clearance groove 138 (i.e., not in communication with the capstan teeth 122), the puck 126 may be rotated to adjust the number of wraps (and braking force) of rope around the capstan shaft 108. Thereafter, the puck 126 is moved away from the clearance groove 138 and reengaged with the capstan teeth 122 so that the orientation of the puck 126 is locked in place. Also shown in FIG. 1C are the capstan shaft 108, stop collar 120, the top surface 139 of the puck 126, the exit port 128, the outer periphery 130, and nut 136.

Figure 2:
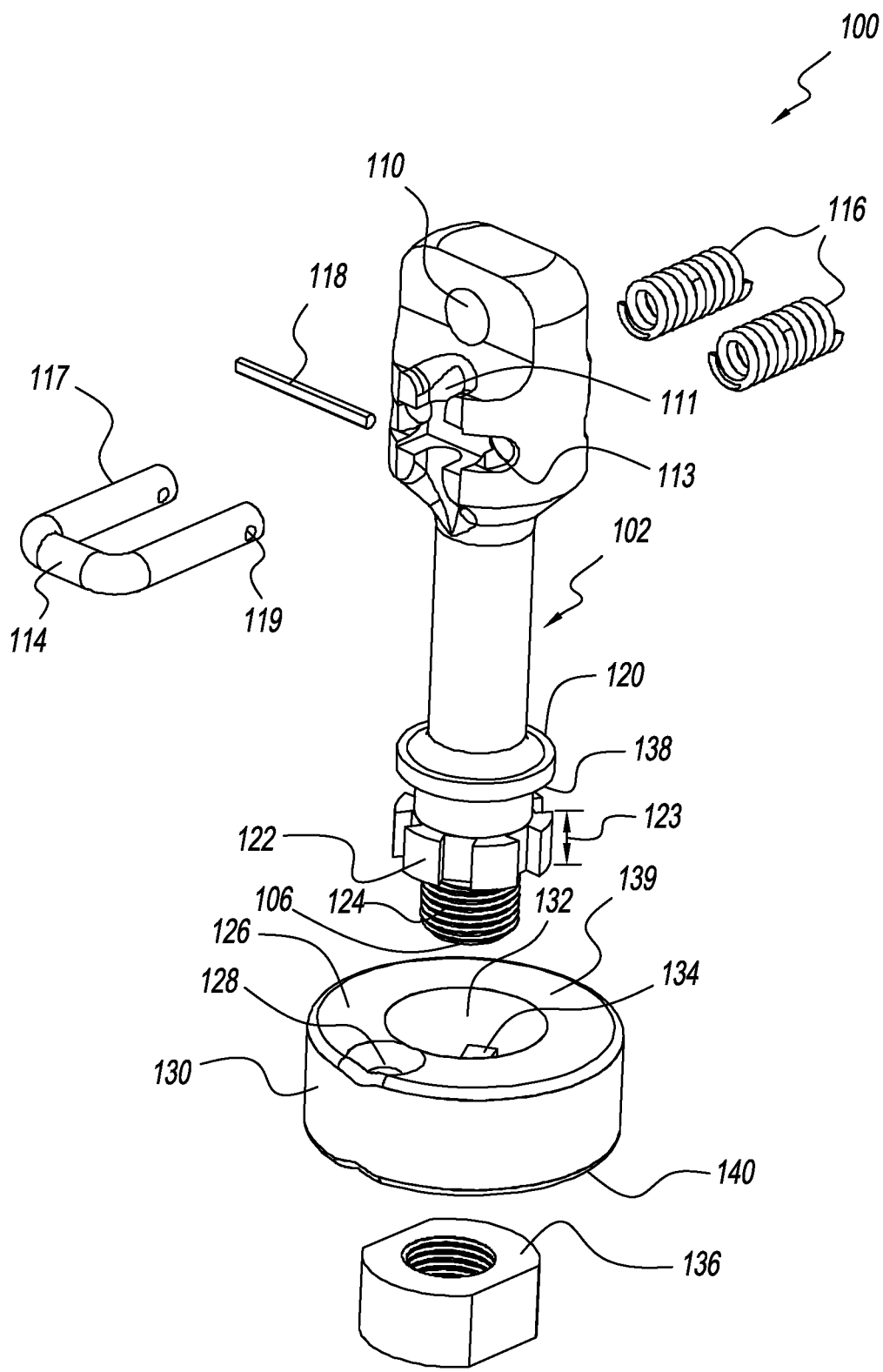
FIG. 2 depicts an exploded view of the device embodiment shown in FIG. 1B and FIG. 1C.

FIG. 2 depicts an exploded view of the device 100 shown in FIG. 1. In FIG. 2, the clamp bar recess 113, the clearance groove 138, capstan teeth 122, inner periphery 132 of the puck 126, and puck teeth 134 on the inner periphery 132 are visible.

The inner periphery 132 and outer periphery 130 are bounded by a top surface 139 and a bottom surface 140. For illustrative purposes only there are eight capstan teeth 122. However, in other embodiments, there may be fewer or more capstan teeth 122 than eight. The capstan teeth 122 have a capstan teeth height 123.

The inner periphery 132 of the puck 126 is adapted to allow passing of the distal end 106 therethrough. The puck teeth 134 align with spaces between the capstan teeth 122. Likewise, the capstan teeth 122 align with spaces between the puck teeth 134. Rotation of the nut 136 onto the capstan threads 124 keeps the puck 126 in communication with the main body 102. The stop collar 120 and nut 136 define the upper and lower limits of movement of the puck 126 in a direction parallel to the longitudinal axis of the main body 102, and a combination of the puck teeth 134 and the capstan teeth 122 limit rotational motion of the puck 126 when the puck teeth 134 are engaged with the capstan teeth 122.

The puck teeth 134 have a height that is less than the height of clearance groove 138. When the puck 126 is moved away from the capstan teeth 122 and towards the stop collar 120, the puck teeth 134 are disengaged from the capstan teeth 122 and the puck teeth 134 are in the clearance groove 138. While the puck teeth 134 are in the clearance groove 138, the puck 126 may be rotated. After rotation of the puck 126 to the desired position, the puck 126 is moved away from the stop collar 120 so that the puck teeth 134 are engaged with the capstan teeth 122.

Figure 3:
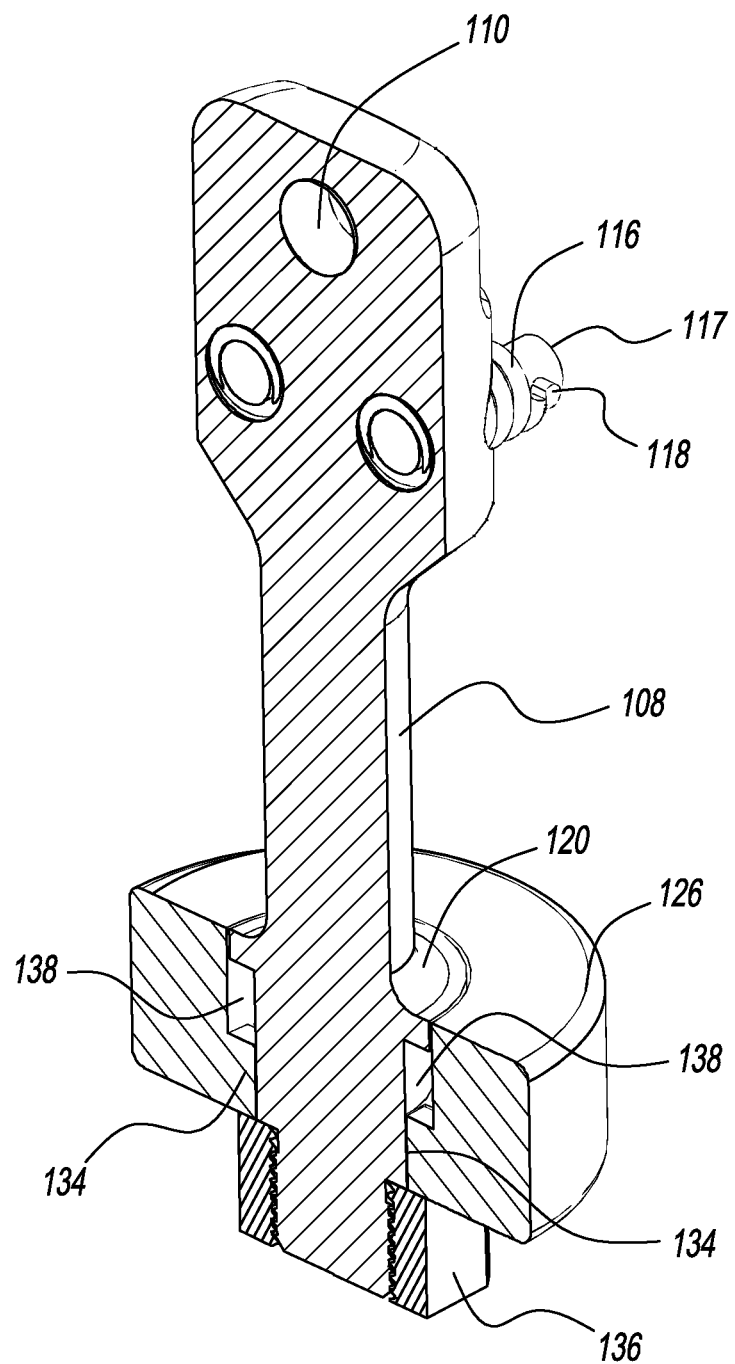
FIG. 3 depicts a cross-sectional view along the A-A line of the embodiment shown in FIG. 1.

FIG. 3 depicts a cross-sectional view along the A-A line of the device 100 shown in FIG. 1. In some embodiments, the puck teeth 134 have a height that is less than the height of the capstan teeth 122. In other embodiments, the puck teeth 134 have a height that is greater than the height of the capstan teeth 122. In yet other embodiments, the puck teeth 134 have substantially the same height as the height of the capstan teeth 122. However, in all embodiments, the puck teeth 134 have a height that is less than the clearance groove 138 to allow rotation of the puck teeth 134 in the clearance groove 138.

Figure 4:
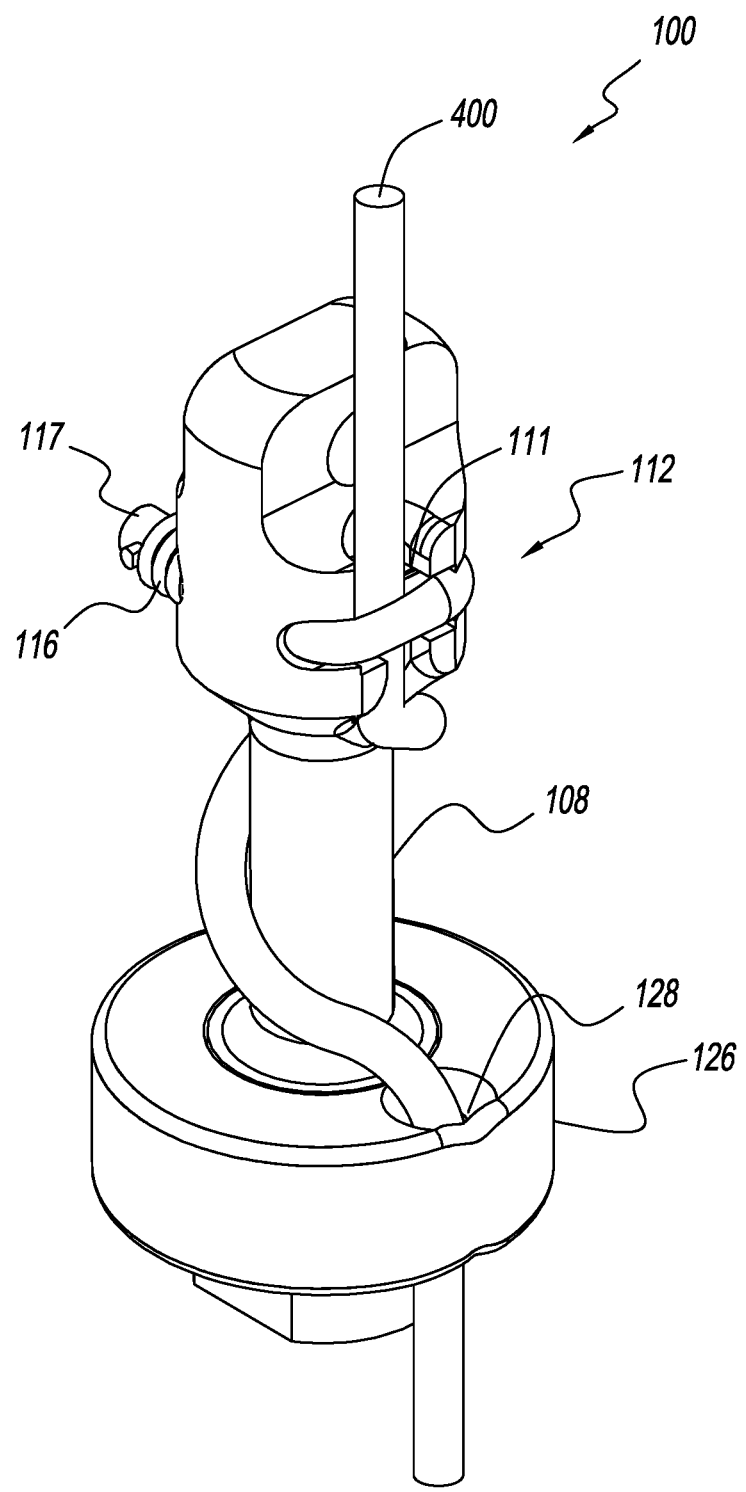
FIG. 4 depicts another perspective view of the embodiment depicted in FIG. 1.

FIG. 4 depicts another perspective view of the device 100. In FIG. 4, a rope 400 is used in the device 100. For example, after a force is applied to the tines 117 that is sufficient to move the U-shaped clamp bar 114 away from the descent line guide 111, the rope 400 is inserted between the descent line guide 111 and U-shaped clamp bar 114 and then through the exit port 128 in the puck 126. When the descent line guide 111 is aligned with the exit port 128 the device 100 provides little or no braking force.

To increase the braking force provide by the device 100, the puck 126 may be moved towards the descent line guide 111 and stop collar 120 so that the puck teeth 134 are in the clearance groove 138. While the puck teeth 134 are in the clearance groove 138, the puck 126 may be rotated as desired. Rotating the puck 126 causes the rope 400 to rotate with respect to the descent line guide 111 and wrap around the capstan shaft 108. The number of puck teeth 134 and capstan teeth 122 determine the minimum incremental rotation that may be made to the puck 126 with respect to the descent line guide 111. For example, a configuration that utilizes four capstan teeth 122 and four puck teeth 134 provides a fewer number of adjustments than a configuration that utilizes twelve capstan teeth 122 and twelve puck teeth 134. For illustrative purposes only, a configuration may be used that utilizes eight capstan teeth 122 and eight puck teeth 134.

Increasing the number of wraps of the rope 400 around the capstan shaft 108 increases the braking force of the device 100. For example, rotating the puck 126 so that the rope 400 has three wraps around the capstan shaft 108 provides more braking force than when the rope 400 is wrapped around the capstan shaft 108 twice.

After the puck 126 has been used to provide the appropriate number of wraps and/or orientation of the exit port 128 with respect to the descent line guide 111, the puck 126 is moved away from the stop collar 120 so that the puck teeth 134 are no longer in clearance groove 138. The puck teeth 134 and capstan teeth 122 are aligned so that each of the puck teeth 134 is between a pair of capstan teeth 122.

Figure 5:
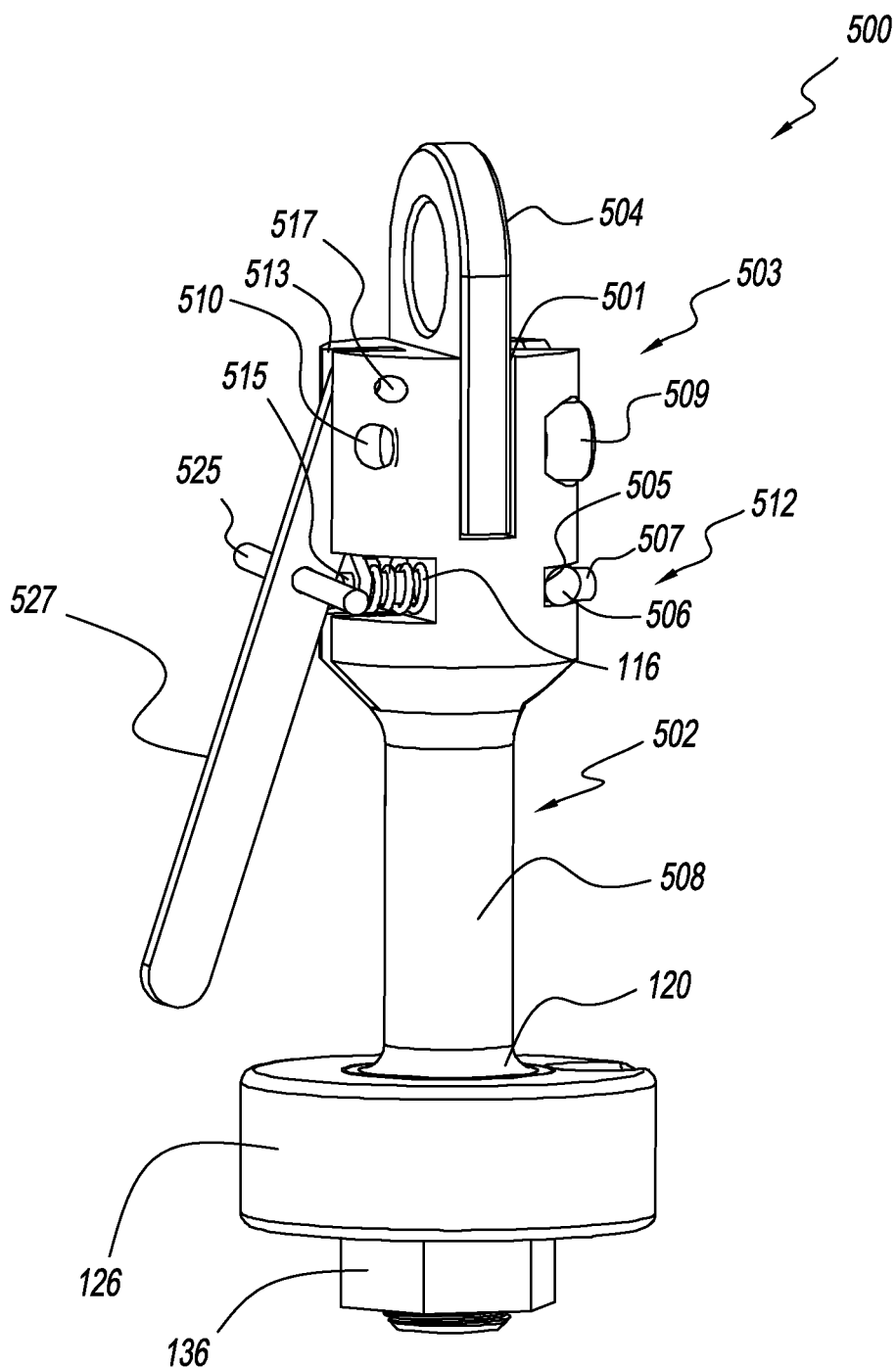
FIG. 5 depicts a perspective view of another embodiment in accordance with aspects disclosed herein.

FIG. 5 depicts another embodiment of a braking device 500 in accordance with aspects disclosed herein. The braking device 500 may include a main body 502 having a longitudinal axis, a proximal end and a distal end as described with respect to FIG. 1.

A clamp assembly 512 and an anchor point 504 are secured to the head 503. In other embodiments, a slot 501 in the head 503 is adapted to receive the anchor-point 504. The head 503 includes bores 510 (only one bore is visible in FIG. 5). Although not visible in FIG. 5, the anchor-point 504 also includes bores that are aligned with bores 510 when the anchor-point 504 is inserted into the slot 501. Bolts 509 are inserted into the bores 510 (and the bores in the anchor-point 504) after insertion of the anchor-point 504 into slot 501 to secure the anchor-point 504 into the slot 501. In various embodiments, the anchor-point 504 and head 503 are a unitary piece.

The head 503 also includes a lever slot 513 for receiving a lever 527. On each side of the lever slot 513 are bores 517. The lever 527 is inserted into the lever slot 513 so that a first bore (not shown in FIG. 5) in the lever 527 is aligned with bores 517. A pin (not shown in FIG. 5) is inserted into the bores 517 and the first bore in the lever 527 to rotatably secure the lever 527 in the lever slot 513. The lever 527 also includes a second bore having a stop pin 525 therethrough.

The head 503 includes a substantially horizontal recess 505 that is adapted to receive a clamp bar 506. The substantially horizontal recess 505 also includes threaded bores therethrough (not shown in FIG. 5) for receiving bolts 507. After the bolts 507 are inserted through the bores in the substantially horizontal recess 505, nuts 515 are used to secure compression springs 116 between the head 503 and nuts 515. When a force is applied to the lever 527 that causes the lever 527 to rotate towards the head 503, the stop pin 526 likewise applies a force to the nuts 515 causing the bolts 507 and clamp bar 506 to move away from the head 503.

A rope (not shown in FIG. 5) is passed down through the descent line guide 511 (shown in FIG. 6) between the head 503 and clamp bar 506. The descent line guide 511 keeps the rope aligned to pass through the clamp bar 506.

Extending along the longitudinal axis and away from the proximal end (and head 503) of main body 502 towards the distal end is the capstan shaft 508. In some embodiments, the capstan shaft 508 is depicted as being cylindrical. However, in other embodiments, the capstan shaft 508 is non-cylindrical (i.e., the diameter of the capstan shaft 508 is non-uniform).

As the capstan shaft 508 extends along the longitudinal axis away from the proximal end towards the distal end is the stop collar 120. Further away from the proximal end, of the main body 502, than the stop collar 120 are capstan teeth (not shown in FIG. 5). On the main body 502, between the stop collar 120 and the capstan teeth is a clearance groove. Neither the clearance groove nor the capstan teeth are shown in FIG. 5.

At the distal end are capstan threads (not shown in FIG. 5). The capstan threads are adapted to receive the nut 136. When the puck 126 is inserted onto the capstan shaft through the distal end, the nut 136 is screwed onto the distal end via the capstan threads. The stop collar 120 and nut 136 keep the puck 126 in communication with the main body 502. The stop collar 120, capstan teeth, clearance groove, and puck in device 500 operate similarly as described above with respect to device 100.

Figure 6:
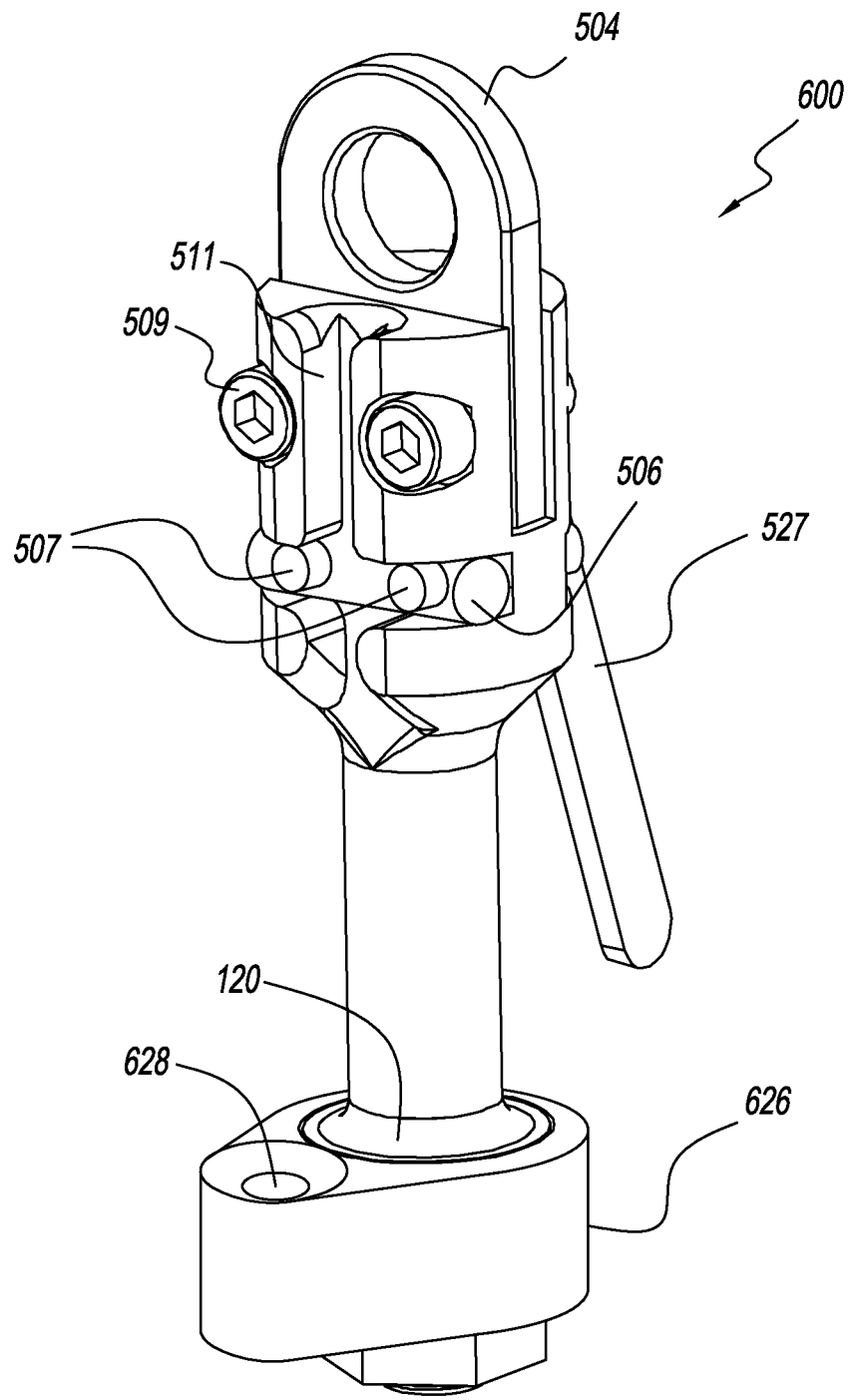
FIG. 6 depicts another embodiment in accordance with aspects disclosed herein.

In any of the embodiments described herein the pucks used may include different shapes. The pucks utilized may have a shape that is symmetrical or asymmetrical; and/or be a polygon or a closed plane curve. For example, FIG. 6 depicts another embodiment of a device 600 in accordance with embodiments disclosed herein. In FIG. 6, the device 600 is similar to the device 500 except that the shape of the puck 626 is a non-circular closed plane curve that includes through-hole 628. In FIG. 6, the view depicted is a different perspective view than that depicted in FIG. 5.

Figure 7:
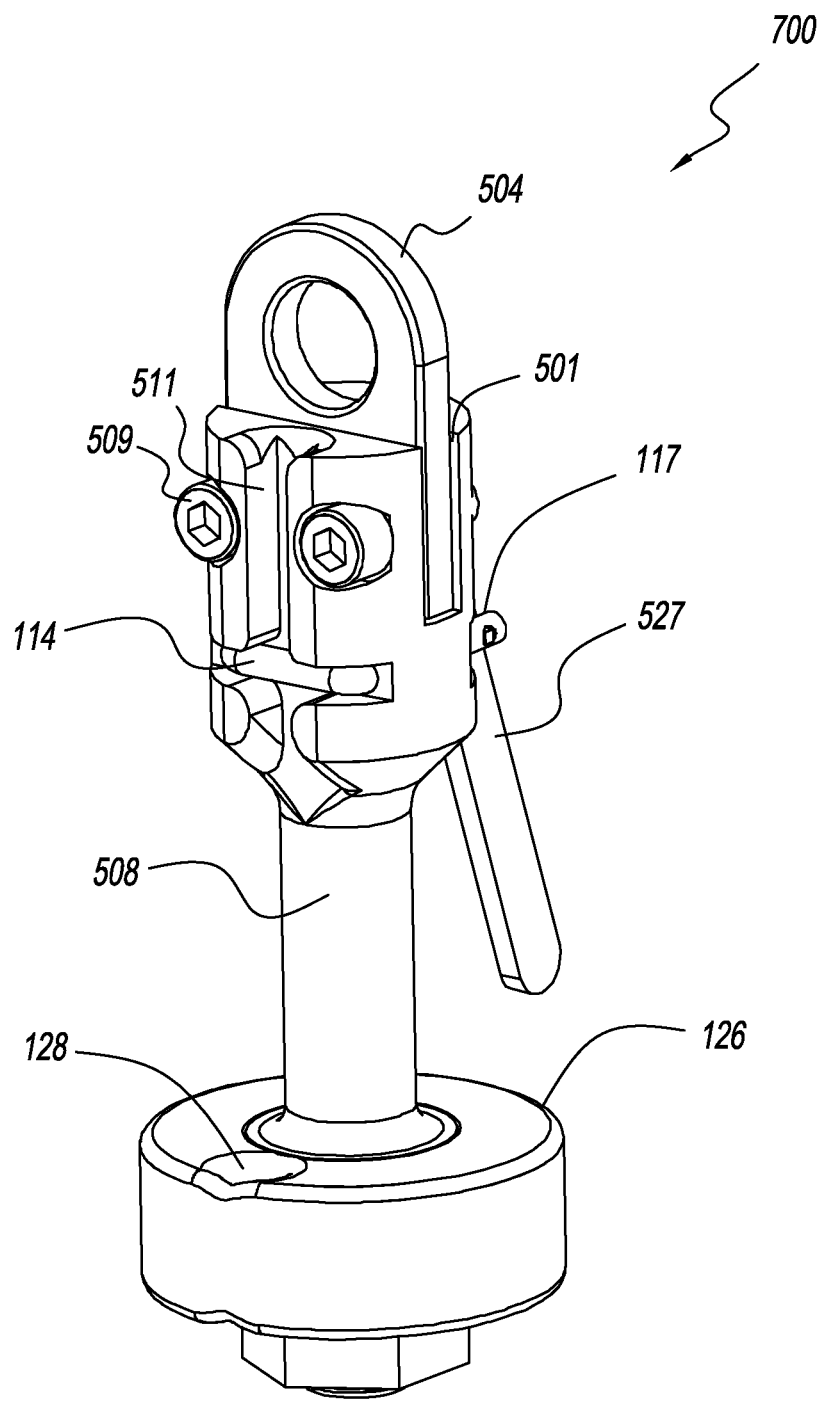
FIG. 7 depicts a perspective view of another embodiment in accordance with aspects disclosed herein.

FIG. 7 depicts another embodiment of a device 700 in accordance with aspects disclosed herein. In FIG. 7, the device 700 is similar to the device 500 except that the clamp assembly utilizes the U-shaped clamp bar 114 rather than clamp bar 506. In addition, two compression springs shown in some embodiments have been replaced by one compression spring 702.

Figure 8:
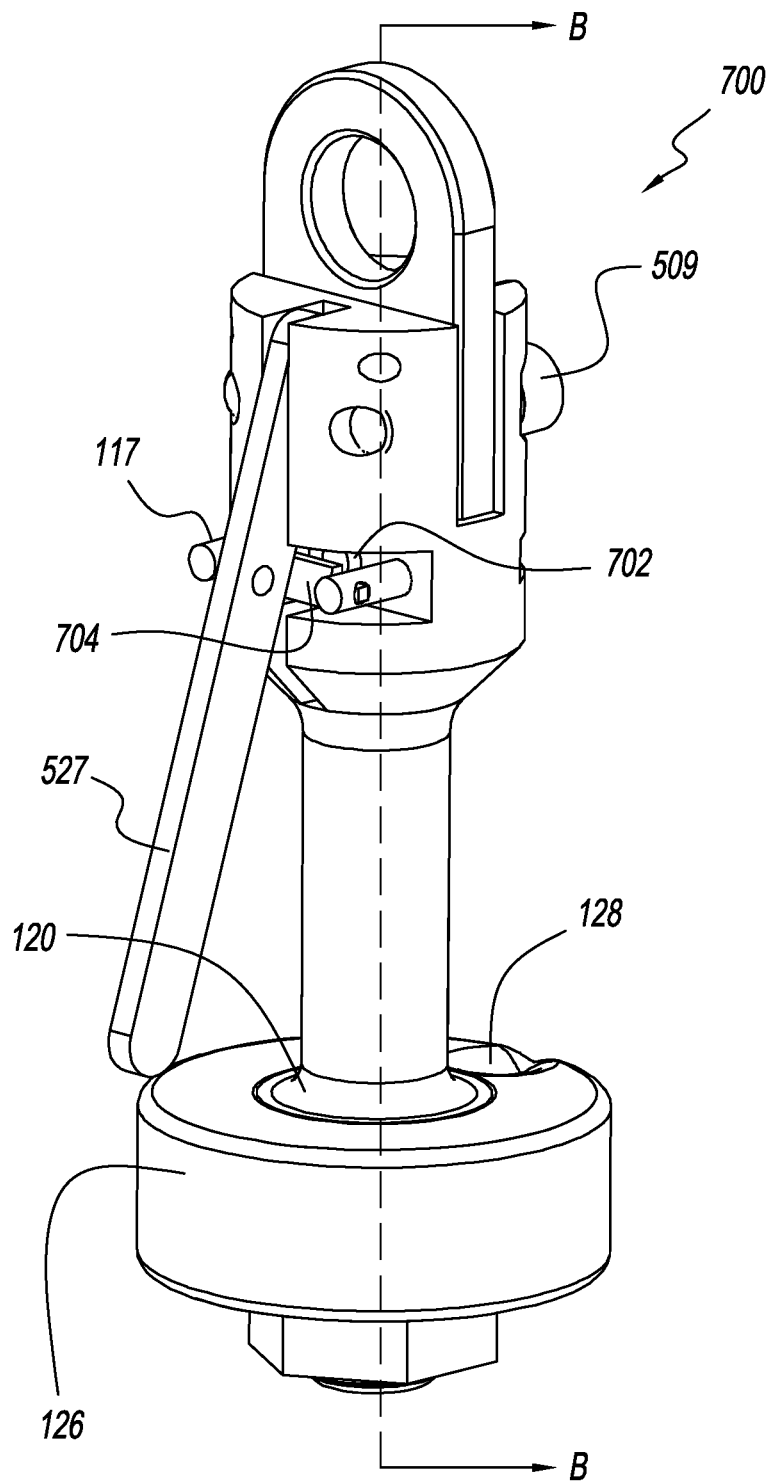
FIG. 8 depicts another perspective view of the embodiment depicted in FIG. 7.
Figure 9:
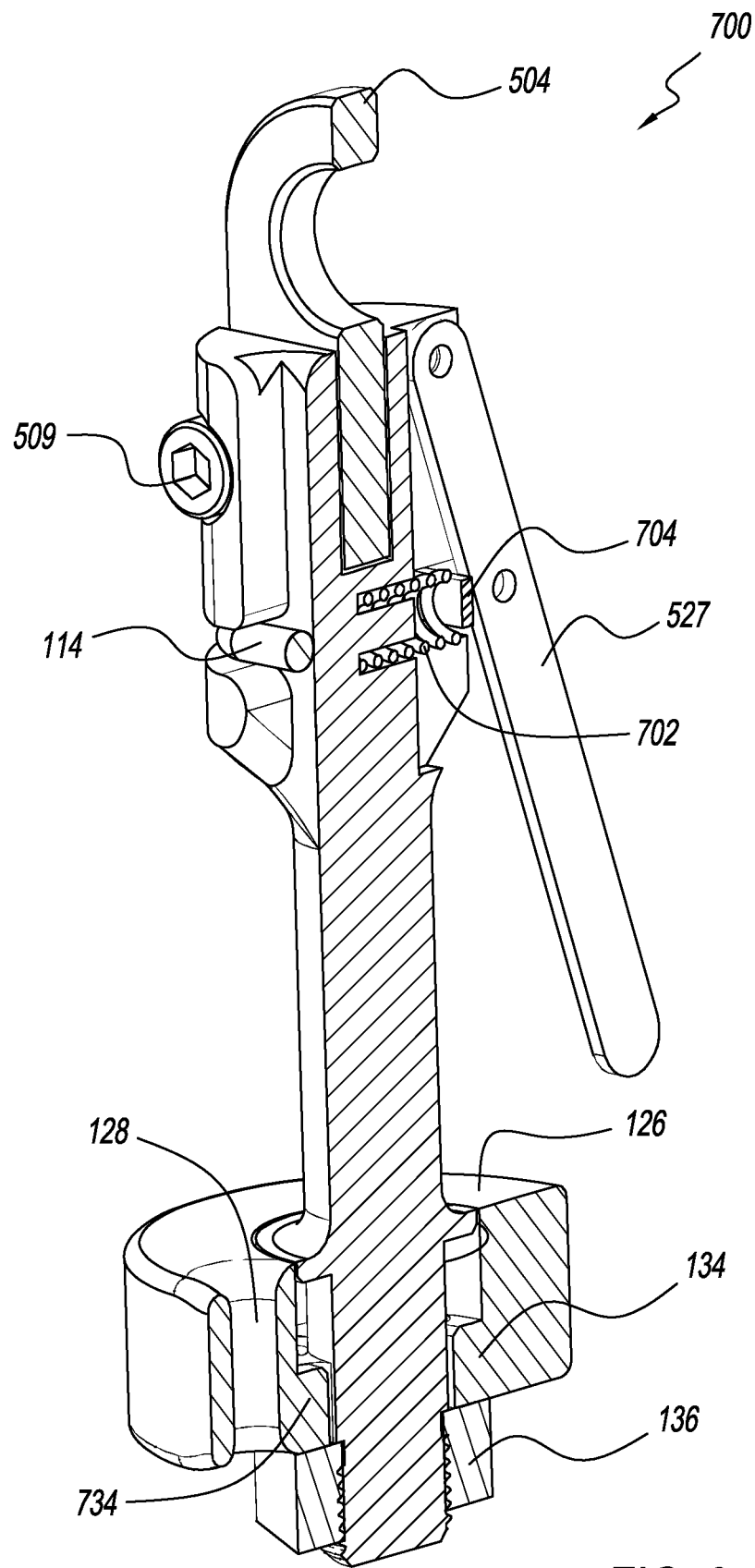
FIG. 9 depicts a cross sectional view along the B-B line of the embodiment depicted in FIGS. 7 and 8.
Figure 10:
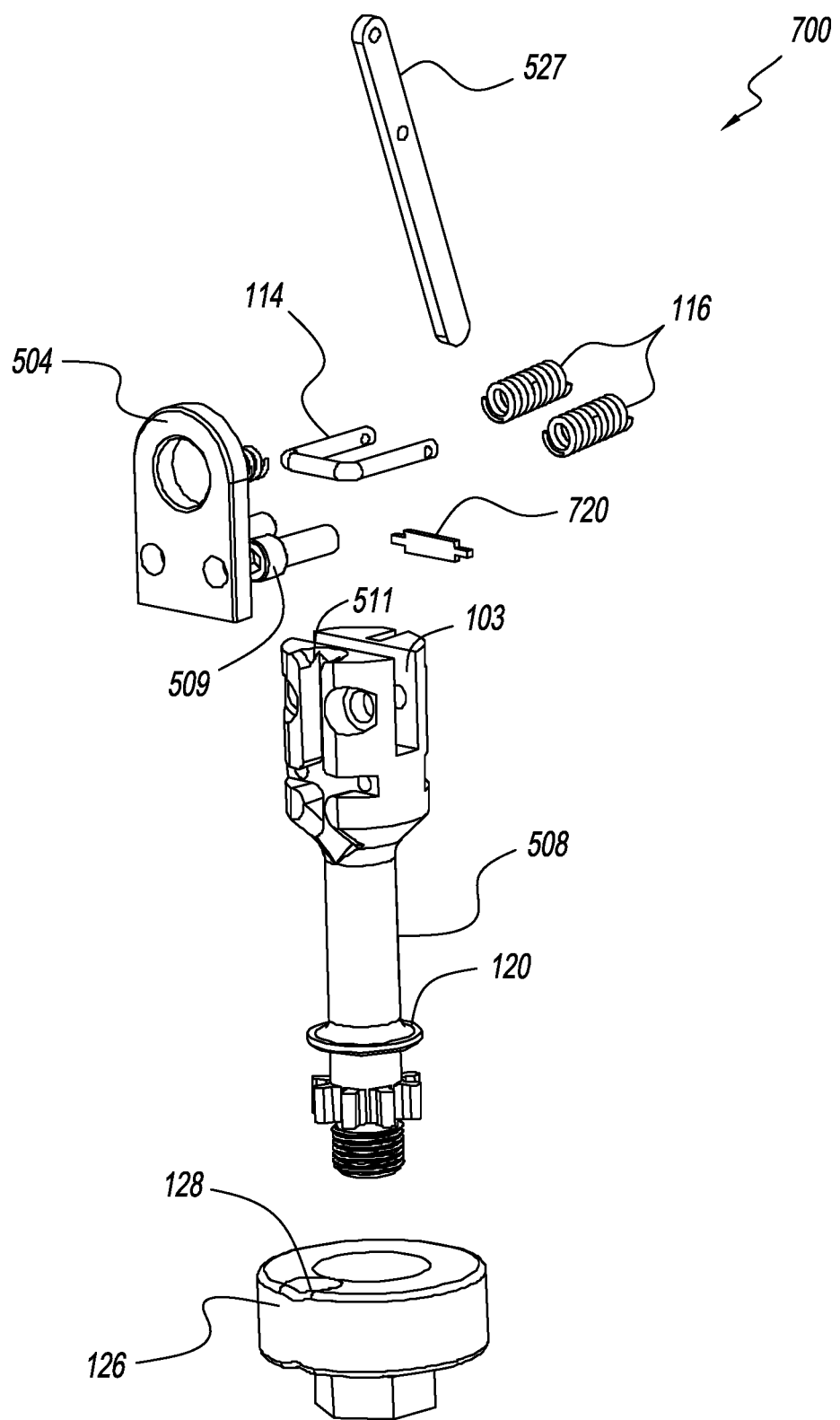
FIG. 10 depicts an exploded view of the embodiment depicted in FIGS. 7, 8 and 9.

In FIG. 8, device 700 is rotated about its longitudinal axis to show an opposite side of the clamp assembly. FIG. 8 depicts the tines 117 of the U-shaped clamp bar 114. A stop plate 704 connects the tines 117. Between stop plate 704 and main body is the compression spring 702. The compression spring 702 acts as a biasing force that urges the U-shaped clamp bar 114 into a recess (not shown in FIG. 8) on the device 700. To move the U-shaped clamp bar 114 out of the recess so that rope may be inserted between a descent line guide (not shown in FIG. 8) and the U-shaped clamp bar 114, the lever 527 is rotated towards the stop plate 704. After insertion of the rope, the lever 527 may be released so that the bias force provided by spring 702 provides a force against the stop plate 704 sufficient to secure the rope in the descent line guide. FIG. 9 depicts a cross sectional view along the B-B line of the embodiment depicted in FIGS. 7 and 8. FIG. 10 depicts an exploded view of the embodiment depicted in FIGS. 7, 8 and 9.

Figure 11:
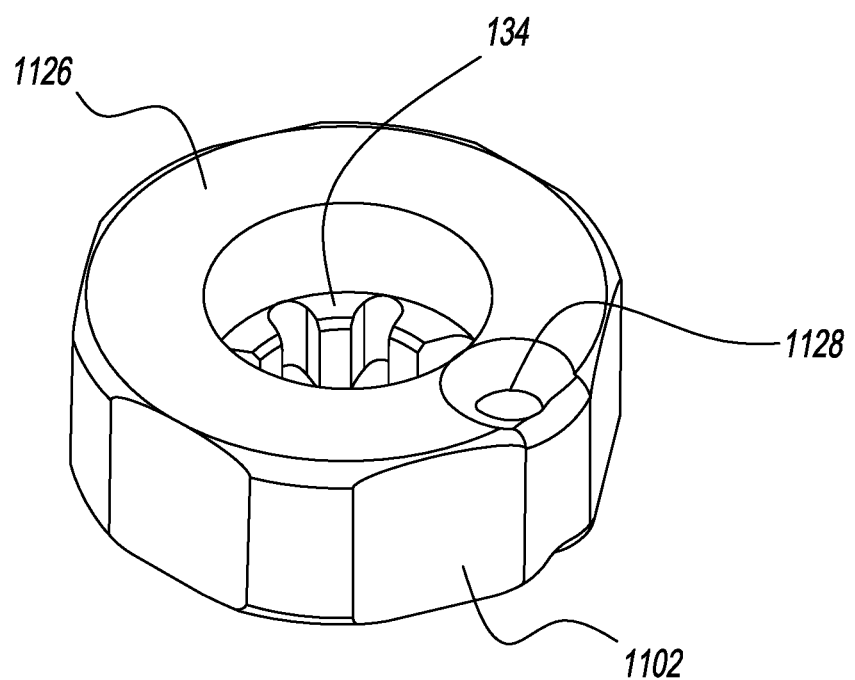
FIG. 11 depicts a perspective view of an embodiment in accordance with aspects disclosed herein.

FIG. 11 depicts a perspective view of an embodiment in accordance with aspects disclosed herein. Specifically, FIG. 11 depicts a puck 1126 having a through-hole 1128 and puck teeth 134. Puck 1126 includes an outer periphery 1102 that is a polygon. Other embodiments can include an outer periphery having a different number of sides than that depicted by outer periphery 1102. Examples of the number of sides that the outer periphery may have are three or more sides.

In the foregoing specification, specific embodiments have been described. However, one of ordinary skill in the art appreciates that various modifications and changes can be made without departing from the scope of the material disclosed herein as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

An "Abstract of the Disclosure" is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A device comprising:
   a capstan,
   wherein the capstan comprises a proximal end, a shaft, a distal end, and a longitudinal axis;
   a head on the proximal end, wherein the head includes a descent line guide aligned with the longitudinal axis;
   a clamp assembly on the head, wherein the clamp assembly is biased towards the descent line guide;
   a stop collar on the shaft;
   shaft threads on the distal end,
   wherein the shaft threads are adapted to mate with corresponding threads on a nut;
   capstan teeth located on the shaft between the shaft threads and the stop collar; and
   a clearance groove on the shaft between the stop collar and the capstan teeth.

2. The device of claim 1 further comprising:
   a puck having a top surface, a bottom surface, an outer peripheral surface, and an inner peripheral surface,
   wherein the top surface and the bottom surface include an aligned bore therethrough, and the top surface and the bottom surface are bounded by the outer peripheral surface and the inner peripheral surface; and
   puck teeth on the inner peripheral surface,
   wherein the puck teeth are adapted to mate with the capstan teeth, and the puck teeth have a height that is less than a height of the clearance groove.

3. The device of claim 1 wherein the outer peripheral surface includes at least one rectangular portion.

4. The device of claim 1 wherein the outer peripheral surface is one of symmetrical and asymmetrical.

5. The device of claim 2 wherein the puck teeth have a same height as a height of the capstan teeth.

6. The device of claim 2 wherein the height of the puck teeth is different than a height of the capstan teeth.

7. The device of claim 1 wherein the head, the capstan, the stop collar, and capstan teeth are one unitary piece.

8. The device of claim 1 wherein the clamp assembly comprises:
- a U-shaped clamp bar,
  wherein the U-shaped clamp bar has two tines, each the two tines includes aligned tine bores therethrough and each of the two tines is adapted for insertion into head bores in the head;
- a pair of compression springs adapted for insertion onto the two tines after the two tines have been inserted through the head bores; and
- a stop pin inserted through the aligned tine bores.

9. The device of claim 1 wherein the clamp assembly comprises:
- a handle pivotally mounted at one end to the head;
- a U-shaped clamp bar,
  wherein the U-shaped clamp bar has two tines, each the two tines includes aligned tine bores therethrough and each of the two tines is adapted for insertion into head bores in the head;
- a stop plate,
  wherein the stop plate includes two ends, each of the two ends includes a stud adapted for insertion into the aligned tine bores; and
- a compression spring between the head and the stop plate.

10. The device of claim 1 wherein the clamp assembly comprises:
- a handle pivotally mounted at one end to the head;
- a bar substantially horizontal across the descent line guide in a substantially horizontal channel in the head, wherein the bar includes two bar bores therethrough, the two bar bores are aligned with two head bores in the head;
- a pair of bolts through the aligned two bar bores and two head bores;
- a pair of compression springs inserted onto the pair of bolts; and
- a stop pin inserted through the handle and in communication with the pair of bolts.

11. The device of claim 10 wherein the pair of bolts are threaded and a nut on each of the threaded bolts secures the pair of compression springs.

12. The device of claim 1 further comprising an anchor point secured to the head.

13. The device of claim 12 wherein the anchor point, the head, the capstan, the stop collar, and capstan teeth are one unitary piece.

14. A device comprising:
- a capstan,
  wherein the capstan comprises a first end and a second end;
- a head attached to the first end;
- a clamp assembly on the head;
- machined threads on the second end;
- a stop collar located between the head and the machined threads;
- capstan teeth located between the stop collar and the machined threads;
- a clearance groove located between the stop collar and the capstan teeth;
- a puck having a top surface, a bottom surface, an outer peripheral surface, and an inner peripheral surface,
  wherein the top surface and the bottom surface include an aligned bore therethrough, and the top surface and the bottom surface are bounded by the outer peripheral surface and the inner peripheral surface; and
- puck teeth on the inner peripheral surface,
  wherein the puck teeth are adapted to mate with the capstan teeth, and the puck teeth have a height that is less than a height of the clearance groove.

15. The device of claim 14 further comprising an anchor point secured to the head.

16. The device of claim 15 wherein the anchor point, the head, the capstan, the stop collar, and capstan teeth are one unitary piece.

17. The device of claim 14 wherein the outer peripheral surface includes at least one rectangular portion.

18. The device of claim 14 wherein the puck teeth have a same height as a height of the capstan teeth.

19. The device of claim 14 wherein the height of the puck teeth is different than a height of the capstan teeth.

20. The device of claim 14 wherein the clamp assembly comprises:
- a U-shaped clamp bar,
  wherein the U-shaped clamp bar has two tines, each the two tines includes aligned tine bores therethrough and each of the two tines is adapted for insertion into head bores in the head;
- a pair of compression springs adapted for insertion onto the two tines after the two tines have been inserted through the head bores; and
- a stop pin inserted through the aligned tine bores.

21. The device of claim 14 wherein the clamp assembly comprises:
- a handle pivotally mounted at one end to the head;
- a U-shaped clamp bar,
  wherein the U-shaped clamp bar has two tines, each the two tines includes aligned tine bores therethrough and each of the two tines is adapted for insertion into head bores in the head;
- a stop plate,
  wherein the stop plate includes two ends, each of the two ends includes a stud adapted for insertion into the aligned tine bores; and
- a compression spring between the head and the stop plate.

22. The device of claim 14 wherein the clamp assembly comprises:
- a handle pivotally mounted at one end to the head;
- a bar substantially horizontal across a descent line guide in a substantially horizontal channel in the head, wherein the bar includes two bar bores therethrough, the two bar bores are aligned with two head bores in the head;
- a pair of bolts through the aligned two bar bores and two head bores;
- a pair of compression springs inserted onto the pair of bolts; and
- a stop pin inserted through the handle and in communication with the pair of bolts.

23. The device of claim 22 wherein the pair of bolts are threaded and a nut on each of the threaded bolts secures the pair of compression springs.

24. A puck comprising:
- a top planar surface;
- a bottom planar surface opposite the top planar surface;

an inner peripheral surface substantially perpendicular to the top planar surface and the bottom planar surface, wherein the inner peripheral surface couples the top planar surface to the bottom planar surface, the inner peripheral surface, the top planar surface and the bottom planar surface define a centrally located bore that is substantially perpendicular to the top planar surface and the bottom planar surface, the inner peripheral surface is adapted to receive a capstan shaft;

puck teeth located on the inner peripheral surface wherein the puck teeth are adapted to mate with capstan teeth on the capstan shaft;

an outer peripheral surface bounding the top planar surface and the bottom planar surface; and a substantially planar exit port surface substantially perpendicular to the top planar surface and the bottom planar surface, wherein the substantially planar exit port surface couples the top planar surface to the bottom planar surface, and the substantially planar exit port surface is between the inner peripheral surface and the outer peripheral surface.

25. The puck of claim 24 wherein the outer peripheral surface has a closed plane curve shape.

26. The puck of claim 24 wherein the outer peripheral surface has a polygon shape.

27. The puck of claim 24 wherein the outer peripheral surface has a spherical shape.

28. The puck of claim 24 wherein the out peripheral surface has a non-spherical shape.

\* \* \* \* \*